United States Patent [19]
Kawamura et al.

[11] Patent Number: 5,122,356
[45] Date of Patent: Jun. 16, 1992

[54] PROCESS FOR PURIFICATION OF HYDROCHLORIC ACID

[75] Inventors: Takuo Kawamura; Tomizo Sota, both of Settsu, Japan

[73] Assignee: Daikin Industries Ltd., Osaka, Japan

[21] Appl. No.: 672,769

[22] Filed: Mar. 20, 1991

Related U.S. Application Data

[63] Continuation of Ser. No. 359,691, May 31, 1989, abandoned.

[30] Foreign Application Priority Data

May 31, 1988 [JP] Japan .................. 63-135162

[51] Int. Cl.$^5$ ............................ C01B 7/07; C07F 7/12
[52] U.S. Cl. ........................ 423/488; 556/466
[58] Field of Search ............. 423/488, 477, 476; 556/453, 456, 465, 466

[56] References Cited

U.S. PATENT DOCUMENTS

| | | | |
|---|---|---|---|
| 2,719,859 | 10/1955 | Nitzsche et al. | 556/456 |
| 2,757,189 | 7/1956 | Classen et al. | 556/453 |
| 4,714,604 | 12/1987 | Olson | 423/488 |
| 4,780,556 | 10/1988 | Hata et al. | 556/477 |

FOREIGN PATENT DOCUMENTS

| | | |
|---|---|---|
| 52-144628 | 12/1977 | Japan . |
| 55-92392 | 7/1980 | Japan . |
| 223604 | 12/1983 | Japan .................. 423/488 |

OTHER PUBLICATIONS

Chemical Abstracts, vol. 100, No. 16, Apr. 16, 1984, p. 130, Abstract No. 123487e, Columbus, Ohio, US: & JP-A-58-223604 (Daikin Kogyo Co.) Dec. 26, 1983.
Patent Abstracts of Japan, vol. 12, No. 117 (C–487) [2964], Apr. 13, 1988, & JP-A-62 241806 (Asahi Glass Co. Ltd.) Oct. 22, 1987.

Primary Examiner—John Niebling
Assistant Examiner—Brian M. Bolam
Attorney, Agent, or Firm—Birch, Stewart, Kolasch & Birch

[57] ABSTRACT

A process for purification of hydrochloric acid containing hydrogen fluoride, which process comprises steps of:

contacting the hydrochloric acid containing hydrogen fluoride with at least one silicon compound of the formula:

$$R^1R^2R^3SiX \tag{1}$$

wherein X is chlorine, hydroxyl or $OSiR^4R^5R^6$, and $R^1$, $R^2$, $R^3$, $R^4$, $R^5$ and $R^6$ are the same or different and alkyl groups having 1 to 4 of carbon atoms, and recovering a trialkylfluorosilane compound produced in said contacting step of the formula:

$$R^1R^2R^3SiF \tag{2}$$

wherein $R^1$, $R^2$ and $R^3$ are the same as defined above, said recovering step comprising sub-steps of: hydrolyzing the produced trialkylfluorosilane compound (2) after the recovery thereof to convert to a trialkylsilanol compound of the formula:

$$R^1R^2R^3SiOH \tag{3}$$

wherein $R^1$, $R^2$ and $R^3$ are the same as defined above, and condensing the trialkylsilanol compound (3) to produce a hexaalkyldisiloxane compound of the formula:

$$R^1R^2R^3SiOSiR^4R^5R^6 \tag{4}$$

wherein $R^1$, $R^2$, $R^3$, $R^4$, $R^5$ and $R^6$ are the same as defined above, silicon compound mixture containing the hexaalkyldisiloxane compound as a main component present after said contacting and recovering steps being recycled to the contacting step for reuse, on the recycling, at least a portion of the silicon compound mixture containing the hexaalkyldisiloxnane compound being chlorinated to produce the trialkylchlorosilane compound.

6 Claims, No Drawings

PROCESS FOR PURIFICATION OF HYDROCHLORIC ACID

This application is a continuation of application Ser. No. 07/359,691 filed on May 31, 1989, now abandoned.

BACKGROUND OF THE INVENTION

1. Field of the Invention

The present invention relates to a process for the purification of hydrochloric acid. Particularly, the present process relates to a process for the purification of hydrochloric acid containing hydrogen fluoride, which process comprises treating hydrochloric acid with at least one silicon compound.

2. Description of the Related Art

When a chlorofluorohydrocarbon is produced through fluorination of a chlorohydrocarbon with hydrogen fluoride, an equimolar amount of hydrogen chloride with consumed hydrogen fluoride is by-produced. Also, when tetrafluoroethylene is produced through thermal decomposition of chlorodifluoromethane, an equimolar amount of hydrogen chloride with decomposed chlorodefluoromethane is by-produced. Such hydrogen chloride is utilized as the by-product hydrochloric acid, but it contains fluorides such as hydrogen fluoride and silicon fluoride as impurities. Since the fluorides are not desired for effective utilization of the by-product hydrochloric acid, it is very important to remove them.

A number of processes have been proposed to remove the fluorides from hydrochloric acid containing them. For example, U.S. Pat. No. 3,411,879 and Japanese Patent Kokai Publication No. 110999/1975 describe processes for the purification of hydrochloric acid comprising removal of fluorine ions with silica gel. However, these processes are not suitable for effective purification of hydrochloric acid containing hydrogen fluoride in a high concentration.

Japanese Patent Kokai Publication No. 223604/1983 describes a process for the purification of hydrochloric acid containing hydrogen fluoride by contacting hydrochloric acid with a silicon compound. In this process, a large amount of an expensive trialkylchlorosilane compound should be used. In addition, it takes a relatively long time to react the by-produced silicon compound mixture comprising a hexaalkyldisiloxane compound as a main component even at a high temperature in order to reuse the silicon compound mixture.

It is found that it takes about five days to purify the silicon compound mixture without stirring at room temperature and takes 150 minutes with stirring at 90° C.

SUMMARY OF THE INVENTION

It is, therefore, an object of the present invention to provide a process for the purification of hydrochloric acid containing hydrogen fluoride while overcoming the problems described above.

According to the present invention, there is provided a process for the purification of hydrochloric acid containing hydrogen fluoride, which process comprises the steps of:

contacting the hydrochloric acid containing hydrogen fluoride with at least one silicon compound having the formula:

$$R^1R^2R^3SiX \tag{1}$$

wherein X is chlorine, hydroxyl or $OSiR^4R^5R^6$, and $R^1$, $R^2$, $R^3$, $R^4$, $R^5$ and $R^6$ are the same or different and are alkyl groups having 1 to 4 of carbon atoms, and recovering a trialkylfluorosilane compound produced in said contacting step having the formula:

$$R^1R^2R^3SiF \tag{2}$$

wherein $R^1$, $R^2$ and $R^3$ are the same as defined above, said recovering step comprising sub-steps of:

hydrolyzing the produced trialkylfluorosilane compound (2) after the recovery thereof to obtain a trialkylsilanol compound of the formula:

$$R^1R^2R^3SiOH \tag{3}$$

wherein $R^1$, $R^2$ and $R^3$ are the same as defined above, and condensing the trialkylsilanol compound (3) to produce a hexaalkyldisiloxane compound having the formula:

$$R^1R^2R^3SiOSiR^4R^5R^6 \tag{4}$$

wherein $R^1$, $R^2$, $R^3$, $R^4$, $R^5$ and $R^6$ are the same as defined above, said silicon compound mixture containing said hexaalkyldisiloxane compound as a main component present after said contacting and recovering steps being recycled to the contacting step for reuse, upon recycling, at least a portion of said silicon compound mixture containing the hexaalkyldisiloxane compound being chlorinated to produce the trialkylchlorosilane compound.

Accordingly, the present invention overcomes the problems of the prior art described above and utilizes effectively the expensive trialkylchlorosilane compound. In addition, the reaction time required for the chlorination of the by-produced hexaalkyldisiloxane compound can be shortened for the sake of reuse.

DETAILED DESCRIPTION OF THE INVENTION

The preferable silicon compound (1) used in the process of the present invention is a compound in which each of $R^1$, $R^2$, $R^3$, $R^4$, $R^5$ and $R^6$ is a methyl, ethyl or n-propyl group. More preferable silicon compounds (1) are trimethylchlorosilane, triethylchlorosilane, tri-n-propylsilanol and hexamethyldisiloxane. Trimethylchlorosilane is particularly preferable, since it is converted to trimethylfluorosilane with a boiling point of 16° C. through the reaction with hydrogen fluoride and can be easily removed from the hydrochloric acid.

In the process according to the present invention, the silicon compound (1) is used in an amount of at least an amount equivalent with the hydrogen fluoride to be removed and there is no upper limit of the amount. However, when a relatively large amount of the silicon compound (1) is used, it takes excessive time for its separation. Thus, on a commercial scale, the amount of the silicon compound (1) is preferably from 1 to 10 times, more preferably from 1 to 5 times equivalent with the hydrogen fluoride to be removed.

A mixture of the silicon compounds (1) may be used, and the composition is not critical. When the concentration of the trialkylchlorosilane compound is too high, that is, the concentration of the trialkylsilanol compound and/or the hexaalkyldisiloxane compound is too low in the mixture, the reaction of the trialkylchlorosilane compound with water contained in hydrochloric acid to produce the trialkylsilanol compound according to the following reaction equation:

$$R^1R^2R^3SiCl + H_2O \rightarrow R^1R^2R^3SiOH + HCl \qquad (I)$$

proceeds from 3 to 4 times faster than the reaction of the trialkylchlorosilane compound with hydrogen fluoride contained in the hydrochloric acid to produce the trialkylfluorosilane compound according to the following reaction equation:

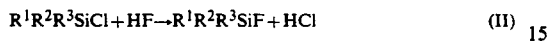

$$R^1R^2R^3SiCl + HF \rightarrow R^1R^2R^3SiF + HCl \qquad (II)$$

Therefore, even when the concentration of the trialkylchlorosilane compound is high, the improvement in the removal of hydrogen fluoride balancing with its high cost cannot be expected. Then, the concentration of the trialkylchlorosilane compound contained in the silicon compound mixture is not necessarily high.

From an economical consideration on the process for purification of the hydrochloric acid, the concentration of the trialkylchlorosilane compound in the mixture is less than 50% by weight, preferably from 1 to 30% by weight, more preferably about 20% by weight. One of the advantages with the use of the trialkylchlorosilane compound at such a concentration is effective utilization of the expensive trialkylchlorosilane. For example, in the process of the present invention, it is sufficient to partially chlorinate the silicon compound mixture containing the hexaalkyldisiloxane compound, and complete chlorination is not always necessary. Further, the concentration of the trialkylchlorosilane can be easily maintained by controlling the extent of the chlorination.

In the process according to the present invention, a chlorohydrocarbon such as tetrachloromethane, trichlorofluoroethylene and the like or a mixture thereof can be optionally used as a solvent for the silicon compound (1).

In the present process, the contacting step of the hydrochloric acid containing hydrogen fluoride with the silicon compound (1) is performed at a temperature of from 0° to 110° C., particularly from room temperature to 50° C. to remove hydrogen fluoride. For this liquid-liquid contact, any apparatus usually used for liquid-liquid contact can be used. For example, a stirred tank type and column type apparatuses can be used, especially in a countercurrent mode. The operation conditions such as a contact time and a contact manner can be suitably selected depending on the composition of the silicon compound mixture (1), the used amount thereof, the temperature on contacting and so on.

In the above contacting step, the silicon compound (1) reacts with hydrogen fluoride to produce the trialkylfluorosilane compound (2), which results in removal of hydrogen fluoride from the hydrochloric acid.

Then, the produced trialkylfluorosilane compound (2) is recovered.

After the contacting operation as described above, the reaction solution separates into two liquid layers, one of which is a lower layer comprising purified hydrochloric acid and the other of which is an upper layer which contains the silicon compound mixture comprising the hexaalkyldisiloxane compound containing the dissolved trialkylfluorosilane compound. Each of these layers can be recovered with a liquid-liquid separation apparatus usually used in the art. The lower layer is recovered as purified hydrochloric acid or further, as required, purified in order to remove a trace amount of hydrogen fluoride, which will be described later.

The recovered upper layer may be directly subjected to hydrolysis. The trialkylfluorosilane compound contained in the hexaalkyldisiloxane compound is converted to the trialkylsilanol compound (3). Then, the trialkylsilanol compound (3) is condensed to produce the hexaalkyldisiloxane compound (4). The produced hexaalkyldisiloxane compound is recovered together with the hexaalkyldisiloxane compound which is originally present in the upper layer.

The hydrolysis of the trialkylfluorosilane compound may be performed, for example, under neutral or alkaline conditions at a temperature of from 0° to 90° C., and the subsequent condensation can be performed at a temperature of from 0° to 90° C.

When the produced trialkylfluorosilane compound has a low boiling point, a portion thereof may be produced in the form of a gas during the contacting step, which can be collected and supplied to the hydrolysis step of the trialkylfluorosilane compound and the subsequent condensation step thereof in order to recover it as the hexaalkyldisiloxane compound.

Then, at least a portion of the silicon compound mixture containing the hexaalkyldisiloxane compound recovered as described above is chlorinated to produce the trialkylchlorosilane compound and reused in the first contacting step in the purification of hydrochloric acid of the present invention.

It is found that the above chlorination can be effectively performed with hydrochloric acid of more than 25% by weight, preferably more than 30% by weight. As explained in the below-described Example 5, when the concentration of hydrochloric acid is less than 20% by weight, the chlorination is substantially impossible. On the contrary, when the concentration of hydrochloric acid is more than 25% by weight, it is unexpectedly possible to chlorinate seven times as much as when the hydrochloric acid of less than 20% by weight is used.

It is also advantageous to use hydrogen chloride as such to produce the trialkylchlorosilane compound in a high concentration. Further, in one preferable embodiment, hydrogen chloride is used in combination with hydrochloric acid.

Depending on the hydrochloric acid containing hydrogen fluoride to be purified, especially, the total amount thereof and the concentration of hydrogen fluoride therein, the concentration of the trialkylchlorosilane compound can be suitably selected, which concentration can be maintained to control the extent of chlorination. It is possible to add fresh trialkylchlorosilane compound from the outside of the system. The chlorination is preferably performed at a temperature from ambient temperature to 60° C.

In order to remove residual hydrogen fluoride in the purified hydrochloric acid obtained through the above steps, it is possible to bubble inert gas such as air, nitrogen or oxygen into purified hydrochloric acid, or to heat purified hydrochloric acid.

The silicon compounds of formulas (1), (2), (3) and (4) are substantially insoluble in an aqueous solution. Thus, in the present invention, during the contacting operation, the hydrolysis operation, the condensation operation and the chlorination operation, it is preferable to mix the reactants mechanically, and after those operations, the reaction mixtures, when allowed, separate into two layers as described in the above explanation on the contacting step. One layer comprises the silicon compounds and the other layer comprises water containing hydrogen chloride, hydrogen fluoride and/or sodium hydroxide. In order to recover the upper silicon compound layer, it is sufficient only to carry out liquid-liquid separation with a conventional apparatus such as a settling device. In the present process, a tank type reactor with a stirrer can be preferably used. During the reaction, the reactants are mixed and after the reaction, the reaction mixture is allowed without stirring.

The present process can be performed not only in a batch mode but also in a continuous mode.

The present invention will be hereinafter described further in detail by the following Examples.

EXAMPLE 1

(1) 300 Grams of 20.3% by weight of hydrochloric acid containing 1870 ppm hydrogen fluoride was charged in a one-liter container made of polyethylene. Then, 60 g of hexamethyldisiloxane containing 20% by weight of trimethylchlorosilane was added into the container, and mixed and allowed to react with the hydrochloric acid. The reaction was performed at room temperature for five minutes while stirring.

(2) During the above reaction, trimethylfluorosilane generated in gas form was bubbled into a 10% by weight aqueous solution of sodium hydroxide in order to hydrolyze trimethylfluorosilane to obtain trimethylsilanol. Then, trimethylsilanol was condensed and hexamethyldisiloxane containing trimethylsilanol was obtained.

(3) After the reaction, the reaction solution separated into two layers, which were divided with a separatory funnel. 296 Grams of the lower layer was obtained as purified hydrochloric acid, which contained 23 ppm of hydrogen fluoride. The removal ratio of hydrogen fluoride was 98.8%.

Hexamethyldisiloxane recovered as the upper layer contained produced trimethylfluorosilane and a small amount of unreacted trimethylchlorosilane. The hexamethyldisiloxane was mixed with the above sodium hydroxide aqueous solution to hydrolyze trimethylfluorosilane and trimethylchlorosilane to obtain trimethylsilanol. Then, the produced trimethylsilanol was condensed to obtain hexamethyldisiloxane containing a small amount of trimethylsilanol. As a whole, 56.0 g of the hexamethyldisiloxane containing trimethylsilanol was recovered from the above step (2) and this step (3). The recovery of hexamethyldisiloxane was 98.0% based on silicon.

(4) 56.0 Grams of recovered hexamethyldisiloxane containing trimethylsilanol and 15 g of 35% by weight hydrochloric acid were supplied to a 200 ml reactor. 3.0 Grams of hydrogen chloride per minute was gradually bubbled in the reactor to allow the reaction. The reaction was performed at 25° C. for 20 minutes.

The produced reaction mixture was separated into two layers. The upper layer (that is, the silicon compound layer) was analyzed by gas chromatography with the SE-30 column. Hexamethyldisiloxane contained 23% by weight of trimethylchlorosilane. Trimethylsilanol was not detected.

(5) The second purification of 300 g of 20.3% by weight hydrochloric acid was carried out. The hydrochloric acid contained 1870 ppm of hydrogen fluoride. In the second purification, the whole amount of hexamethyldisiloxane containing trimethylchlorosilane obtained from the step (4) was used.

Purified hydrochloric acid contained 15 ppm of hydrogen fluoride. 53.1 Grams of hexamethyldisiloxane containing trimethylsilanol was recovered as in the first purification. The recovery of hexamethyldisiloxane relative to used hexamethyldisiloxane was 94.8% based on silicon.

(6) The third purification was carried out as in step (5). Purified hydrochloric acid contained 17 ppm of hydrogen fluoride. The amount of recovered hexamethyldisiloxane was 50.7 g.

EXAMPLE 2

296 Grams of 20.3% by weight purified hydrochloric acid obtained through the steps of (1), (2) and (3) in Example 1 was supplied to a one-liter reactor. Nitrogen was bubbled at the flow rate of 4 l/min at 25° C.

After ten minutes, the concentration of hydrogen fluoride in purified hydrochloric acid was less than 1 ppm.

EXAMPLE 3

300 Grams of 20.7% by weight hydrochloric acid containing 245 ppm of hydrogen fluoride was purified under the same conditions as in the steps (1) to (3) of Example 1. In this example, 10 g of hexamethyldisiloxane containing 25% by weight of trimethylchlorosilane was used which was obtained through the same treatment as in Example 1 except that 35% by weight hydrochloric acid combined with hydrogen chloride was used in the chlorination operation. Purified hydrochloric acid contained 7 ppm of hydrogen fluoride.

EXAMPLE 4

150 Grams of hexamethyldisiloxane was reacted with 100 g of 35% by weight hydrochloric acid for ten minutes at 20° C. to obtain 152 g of hexamethyldisiloxane containing 4.6% by weight of trimethylchlorosilane.

30 Grams of obtained hexamethylchlorosilane was used to purify 300 g of 20.7% by weight hydrochloric acid containing 245 ppm of hydrogen fluoride under the same condition as in the steps (1) to (3) of Example 1.

Resulted purified hydrochloric acid contained 4 ppm of hydrogen fluoride.

EXAMPLE 5

Chlorination of hexamethyldisiloxane was performed with a different concentration of the hydrochloric acid. 40 Grams of each hydrochloric acid was reacted with 5 g of hexamethyldisiloxane at 25° C. for 5 minutes, respectively.

After the reaction, the reaction solution was divided into the upper layer and the lower layer with a separatory funnel. The upper layer comprised hexamethyldisiloxane, and the lower layer comprised purified hydrochloric acid.

The concentration of trimethylchlorosilane in the upper layer was determined by gas chromatography with the SE-30 column.

The results are shown in Table 1.

TABLE 1

| Concentration of used hydrochloric acid (wt %) | Concentration of trimethylchlorosilane in upper layer (wt %) |
| --- | --- |
| 35.0 | 10.1 |
| 33.0 | 5.6 |

TABLE 1-continued

| Concentration of used hydrochloric acid (wt %) | Concentration of trimethylchlorosilane in upper layer (wt %) |
|---|---|
| 31.0 | 2.4 |
| 28.9 | 1.0 |
| 26.8 | 0.45 |
| 25.0 | 0.15 |
| 20.5 | 0.02 |

EXAMPLE 6

25 Grams of hexamethyldisiloxane was supplied into a 100 ml round flask with a reflux condenser. Hydrogen chloride was bubbled into hexamethyldisiloxane at the flow rate of 3.0 g/min. to produce trimethylchlorosilane.

During the reaction, the concentration of trimethylchlorosilane in hexamethyldisiloxane was determined as in Example 5. The results are shown in Table 2.

TABLE 2

| Reaction time (min.) | Concentration of trimethylchlorosilane (wt %) |
|---|---|
| 10 | 26.1 |
| 20 | 38.0 |
| 30 | 51.3 |

What is claimed is:

1. A process for the purification of hydrochloric acid containing hydrogen fluoride, said process comprising the steps of:

(a) contacting at a temperature of 0° to 110° C. said hydrochloric acid containing hydrogen fluoride with a mixture of silicon compounds having the formula:

$$R^1R^2R^3SiX \qquad (1)$$

wherein X is chlorine, hydroxyl or OSiR$^1$R$^2$R$^3$, and R$^1$, R$^2$ and R$^3$ are the same or different and are alkyl groups having from 1 to 4 carbon atoms, wherein said mixture of the silicon compounds comprises hexaalkyldisiloxane as the main component and 1 to 30% by weight of trialkylchlorosilane; and (b) recovering a trialkylfluorosilane compound produced in said contacting step (a), said trialkylfluorosilane compound having the formula:

$$R^1R^2R^3SiF \qquad (2)$$

wherein R$^1$, R$^2$ and R$^3$ are the same as defined above, said recovering step comprising sub-steps of:

(i) hydrolyzing under a neutral or alkaline condition at a temperature of from 0° to 90° C. said produced trialkylfluorosilane compound (2) after recovery thereof to obtain a trialkylsilanol compound having the formula:

$$R^1R^2R^3SiOH \qquad (3)$$

wherein R$^1$, R$^2$ and R$^3$ are the same as defined above, and (ii) condensing said trialkylsilanol compound (3) to produce a hexaalkyldisiloxane compound having the formula:

$$R^1R^2R^3SiOSiR^1R^2R^3 \qquad (4)$$

wherein R$^1$, R$^2$ and R$^3$ are the same as defined above, wherein a silicon compound mixture containing said hexaalkyldisiloxane compound as a main component present after said contacting and recovering steps is recycled to said contacting step (a) for reuse, and wherein upon recycling, at least a portion of said silicon compound mixture containing said hexaalkyldisiloxane compound is chlorinated with hydrochloric acid of a concentration of more than 25% by weight to produce a trialkylchlorosilane compound.

2. The process according to claim 1, wherein R$^1$, R$^2$ and R$^3$ are each methyl and X is chlorine.

3. The process according to claim 1, wherein upon recycling, at least a portion of said silicon compound mixture containing said hexaalkyldisiloxane compound is chlorinated with hydrochloric acid of a concentration of more than 25% by weight in combination with hydrogen chloride to produce a trialkylchlorosilane compound.

4. The process according to claim 1, wherein in step (a), said mixture of the silicon compounds comprises more than 50% by weight of the hexaalkyldisiloxane component.

5. The process according to claim 1, wherein in step (a) said mixture of the silicon compounds comprises at least 75% by weight of the hexaalkyldisiloxane component.

6. The process according to claim 1, wherein in step (a), said mixture of the silicon compounds comprises at least 80% by weight of the hexaalkyldisiloxane component.

* * * * *